United States Patent [19]
McGlothlin et al.

[11] Patent Number: 5,624,136
[45] Date of Patent: Apr. 29, 1997

[54] SAFETY SYSTEM ATTACHED TO SEAT BELT IN A MOTOR VEHICLE

[76] Inventors: Mark D. McGlothlin; Charles J. Fagan, both of P.O. Box 725, Bremerton, Wash. 98337

[21] Appl. No.: 508,665

[22] Filed: Jul. 28, 1995

[51] Int. Cl.$^6$ .................................................. B60R 22/00
[52] U.S. Cl. ............................... 280/801.1; 297/467
[58] Field of Search .................... 280/801.1, 808; 297/464, 467

[56] References Cited

U.S. PATENT DOCUMENTS

| | | | |
|---|---|---|---|
| 2,612,936 | 10/1952 | Lansaw | 297/467 |
| 3,052,432 | 9/1962 | Martin | 297/467 |
| 4,190,287 | 4/1980 | Lemisch et al. | |
| 4,702,523 | 10/1987 | Schrader et al. | 297/467 |
| 4,951,965 | 8/1990 | Brown | |
| 5,005,865 | 4/1991 | Kruse | 297/467 |
| 5,076,608 | 12/1991 | Shimose | |
| 5,135,257 | 8/1992 | Short | 280/808 |
| 5,257,854 | 11/1993 | Korneliussen | 297/467 |
| 5,352,024 | 10/1994 | Grene | 297/467 |

*Primary Examiner*—Eric D. Culbreth

[57] ABSTRACT

A device for positioning and maintaining the lap strap portion of a vehicle seat belt in a downward direction on the pelvic bones of a pregnant woman is provided which includes top, bottom and seat members, in order to avoid the lap strap from laying across the womb, is implemented. The Top Member and Bottom Member is connected together by a fastener between them. The Top Member is looped around the lap strap of the seat belt, the Bottom Member is fastened to the underside of the vehicle's seat. The Seat Member is attached to the automobile's seat and straddle the Bottom Member holding the Bottom Member in easy access to the user. The device is adjustable in length. Ultimately, the three member device holds the lap strap of the seat belt properly across the lower abdominal region.

3 Claims, 10 Drawing Sheets

SAFETY SYSTEM ATTACHED TO SEAT BELT IN A MOTOR VEHICLE

Reference Cited:
U.S. PATENT DOCUMENTS
 U.S. Pat. No. 3,925,853 December 1975 Nicklin
 U.S. Pat. No. 4,190,287 Feburary 1980 Lemisch et al.
 U.S. Pat. No. 4,411,473 October 1983 Ettridge
 U.S. Pat. No. 4,738,413 April 1988 Spinosa et al.
 U.S. Pat. No. 4,951,965 August 1990 Brown
 U.S. Pat. No. 5,005,865 April 1991 Kruse
 U.S. Pat. No. 5,076,608 December 1991 Shimose
 U.S. Pat. No. 5,257,854 October 1993 Korneliussen
 U.S. Pat. No. 5,352,024 October 1994 Grene

BACKGROUND OF THE INVENTION

Field of the invention

The present invention relates in general to a safety system attached to the seat belt system installed in a motor vehicle. We've learned from studying the laws of physics that when an automobile is in motion, all objects within it, such as an occupant, are also said to be in motion. If the moving automobile suddenly stops, as in the event of an accident where it is struck by or strikes another object, the occupant still continues to travel at the same speed and direction as when the vehicle had been in motion. The occupant will continue in motion until something stops them, usually the steering wheel, dashboard, windshield or other part of the automobile's interior, if they are not restrained by a seat belt. Most injuries and fatalities that occur during an automobile accident are the result of such incidents.

Most states have laws requiring motor vehicles to have seat belts installed and require all its occupants to wear them when in the vehicle. Seat belts strap an individual across the waist and shoulders to the seat of the car and are designed so that they firmly hold the individual to the seat in an accident. Because an individual is restrained to the vehicle's seat by the seat belt, they are presumed to incur less serious and fatal injuries in an accident. Seat belts come in many configurations. A seat belt consists of, as a minimum, a strap that is secured across the occupants lower abdomen. This strap crossing the users' abdomen is commonly called a lap strap. Most seat belts in vehicles today incorporate the use of a shoulder strap with the lap strap. The shoulder strap extends from the outside of one of the users hips and travels up across the users torso to their shoulder on the opposite side. The belt crossing the users torso is commonly called the shoulder strap. In some vehicles, shoulder straps and lap belts are provided in the rear passenger seats as well as the front passenger seats. Some vehicles automatically put the shoulder strap on the passenger as they sit in the vehicles' seats. These are called automatic seat belts.

Most of us are reasonably comfortable when wearing a seat belt and are, indeed, safer than without one. However, pregnant women and their fetuses' are not as safe with a seat belt as they could be because of the change in size and shape of the woman's growing abdomen. The fetus inside of a pregnant woman is very delicate and is located slightly above her pelvic bone shortly after conception. The lap strap tends to ride across the abdomen of a pregnant woman where the fetus is located, instead of below this critical area. Because of this, some pregnant women choose not to wear their seat belt, or lap strap if the vehicle is equipped with an automatic shoulder harness, for fear of the potential injuries the lap strap may inflict on the fetus. If the pregnant woman is in an automobile accident while the lap strap is across her abdomen, the fetus is in danger of being seriously, and maybe even fatally, harmed when the mother's torso slides slightly forward against the lap strap as the seat belt tries to restrain her in the car seat as before mentioned.

A number of books published on the subject of prenatal care often caution the expectant mother to make sure that when riding in a car, the lap strap is placed snugly under her abdomen, and as low on her hips as possible. She is never to place the lap strap directly across or above her abdomen where it can cause major injuries to the fetus in an accident. This way, if the expectant mother is in an accident, the strap under her abdomen will not exert direct pressure on the fetus as the strap holds her firmly to the car seat. However, if for the following reasons the lap strap is not positioned correctly on the mother to be because: she forgets to adjust the seat belt as suggested by the experts, her position on the seat prevents proper lap strap placement, her clothing and/or size interferes with the proper use of the lap belt, then the fetus will receive the pressure of the lap belt directly in an event of an accident.

The description of this patent addresses specifically pregnant woman. However, other people with special conditions may also find it advantageous in making use of this invention. People who are obese or have had colostomies, ureterostomies, various surgeries or abdominal abnormalities caused by disease or birth defects can also use this invention to be safer and feel more comfortable when in a motor vehicle.

The description of this patent also addresses specifically cars and car seats. However, other modes of transportation such as airplanes and other seats such as wheel chairs can also use this invention.

Thus, the objective of this invention is to help prevent the lap strap of a seat belt from riding across the abdomen of a pregnant woman.

SUMMARY OF THE INVENTION

The present invention is directed towards the repositioning of an existing seat belt lap strap for pregnant women, situation of having the lap strap cross over the abdomen where the fetus lies will not normally occur when riding in an automobile.

Specifically, the invention consists of a Top Member, a Bottom Member and a Seat Member. The Top Member is wrapped around the lap strap of the seat belt, and is positioned between the use'rs legs when the seat belt is worn. The Top Member employs half of a buckling assembly that allows it to be attached to a Bottom Member. The Bottom Member has the second half of the before mentioned buckling assembly attached to the Top Member. The Bottom Member attaches to the Top Member with the buckling assembly on the lap strap, flows over the seat cushion of the car seat between the user's legs, folds down over the seat and is attached to the underside of the car seat by the opposite end. The Bottom Member is also adjustable in length. Since the Bottom Member attaches to the underside of the car seat it will have a tendency to lay on the floor of the automobile when not in use. The Seat Member attaches to the car seat, straddling the Bottom Member as it folds down over the seat cushion of the car seat, holding the Bottom Member up and off the floor of the automobile, allowing the user easier access to the Bottom Member.

When the user is wearing a seat belt and has the Top Member and Bottom Member properly installed and adjusted, the present invention serves to pull the lap strap of the seat belt down and hold it as low as possible on the abdomen, thus providing maximum protection to the pregnant woman and her fetus.

When the present invention is assembled and installed as described, the user need only to open the car door and sit in the car seat as she normally would. After securing her car seat belt across her abdomen the user reaches between her legs and retrieves the bottom part of the buckle assembly of the Bottom Member and brings it up towards the lap strap. With one hand on the Top Member's buckle assembly and the other hand on the Bottom Member's buckle assembly, the user connects the two parts of the buckle. The user now places the lap strap below her lower abdomen as low as on her hips as possible and adjusts the length of the Bottom Member until all slack in the Bottom Member is removed, holding the lap strap in place below the user's abdomen.

If the user were now in an automobile accident, the present invention ensures she and her fetus are as safe as possible because the lap strap she is wearing is held properly below her lower abdomen, attempting to minimize injuries to her and the fetus. Use of the present invention along with the vehicle's seat belt provide the intended protection to both the mother and the fetus.

The present invention does not hold the mother in her car seat and does not attempt to imply so in any way. The present invention simply ensures the car seat belt remains where it is needed to provide the most protection to the pregnant woman and her unborn baby. For this reason, the present invention is not designed for strength like the seat belts.

The present invention can be manufactured in many colors, some quite brilliant. The attractiveness and brilliance of the colors serve as a reminder to the mother to use her seat belt and to use the present invention.

The intention of the present invention is to help prevent more injuries and fatalities than what a car seat belt can solely offer and make the user more comfortable when riding in an automobile.

The alternatives to this invention are: one, constantly hold or fold the lap strap under the user's abdomen when riding in the car to ensure the lap strap remains under the abdomen the entire time the user is in the vehicle and two, choose not to wear the lap strap of a seat belt when riding in a vehicle and hope that mother and baby still survive a crash. Both of these alternatives can be eliminated by the regular use of the present invention when used with the seat belt.

The present invention encompasses the features of construction, combination of elements and parts arrangements being characterized in the construction hereinafter set forth. The scope of the invention will be indicated in the claims.

BRIEF DESCRIPTION OF THE DRAWINGS

FIG. (1) is a front view of the Top Member, which is attached to the lap strap of the seat belt as shown in FIG. (7).

FIG. (2) is a side view of the Top Member, which is attached to the lap strap of the seat belt as shown in FIG. (7).

FIG. (3) is a front view of the Bottom Member, which is attached to the underside of the car seat as shown in FIG. (8).

FIG. (4) is a side view of the Bottom Member, which is attached to the underside of the car seat as shown in FIG. (8).

FIG. (5) is a front view of the Seat Member, which is attached to the underside of the face of the car seat as shown in FIG. (9).

FIG. (6) is a side view of the Seat Member, which is attached to the underside of the face of the car seat as shown in FIG. (9).

FIG. (7) is a front view of the top member, which is attached to the lap strap in an automobile.

FIG. (8) is a front view of the bottom member, which is attached to the underside of the car seat.

FIG. (9) is a front view of the seat member and bottom member, which is attached to the underside of the face of the car seat.

FIG. (10) is a view of how the Top Member, Bottom Member and Seat Member work in conjunction with the car seat and lap strap in an automobile.

DESCRIPTION OF THE PREFERRED EMBODIMENT

The invention is a device consisting of three individual members, the Top Member, Bottom Member and the Seat Member. Each member comprises of attachable ends and is adjustable in overall length.

Figure 1:
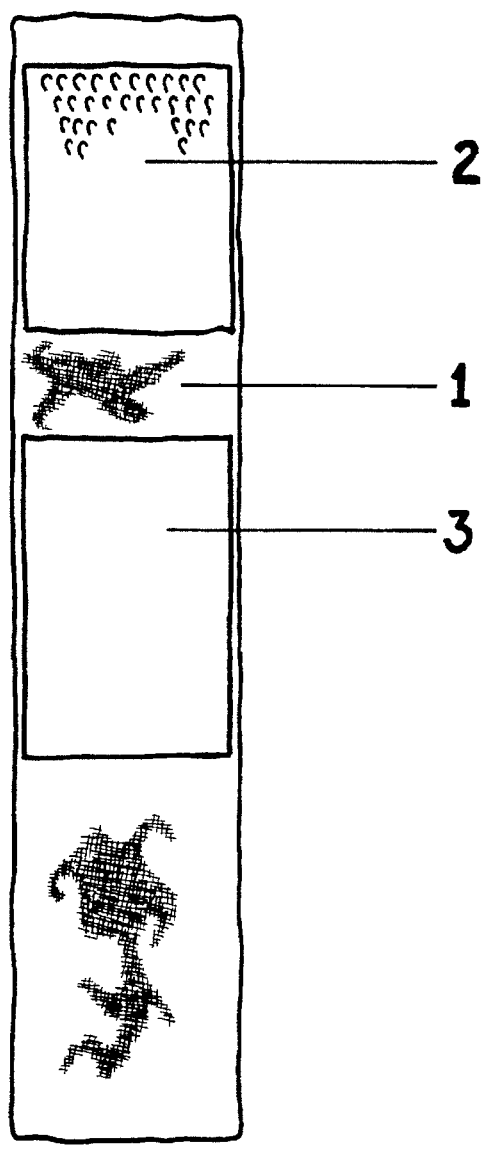
Figure 1:
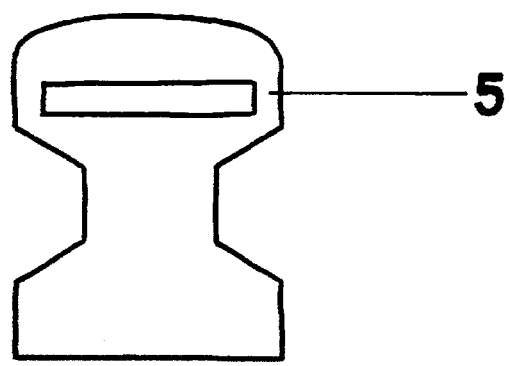
Figure 2:
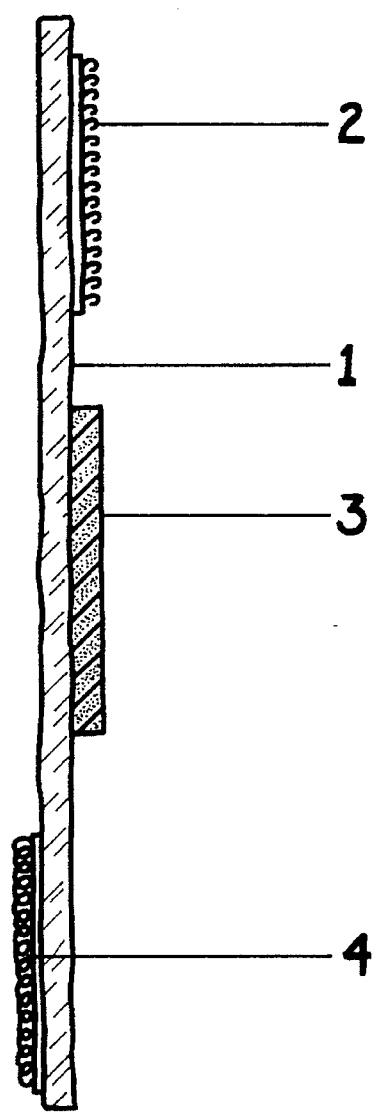
Figure 2:
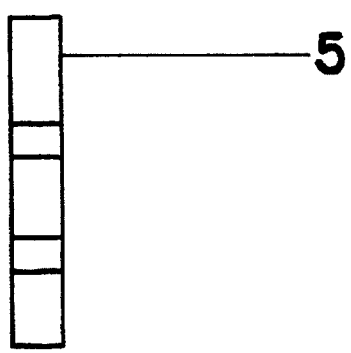
Figure 7:
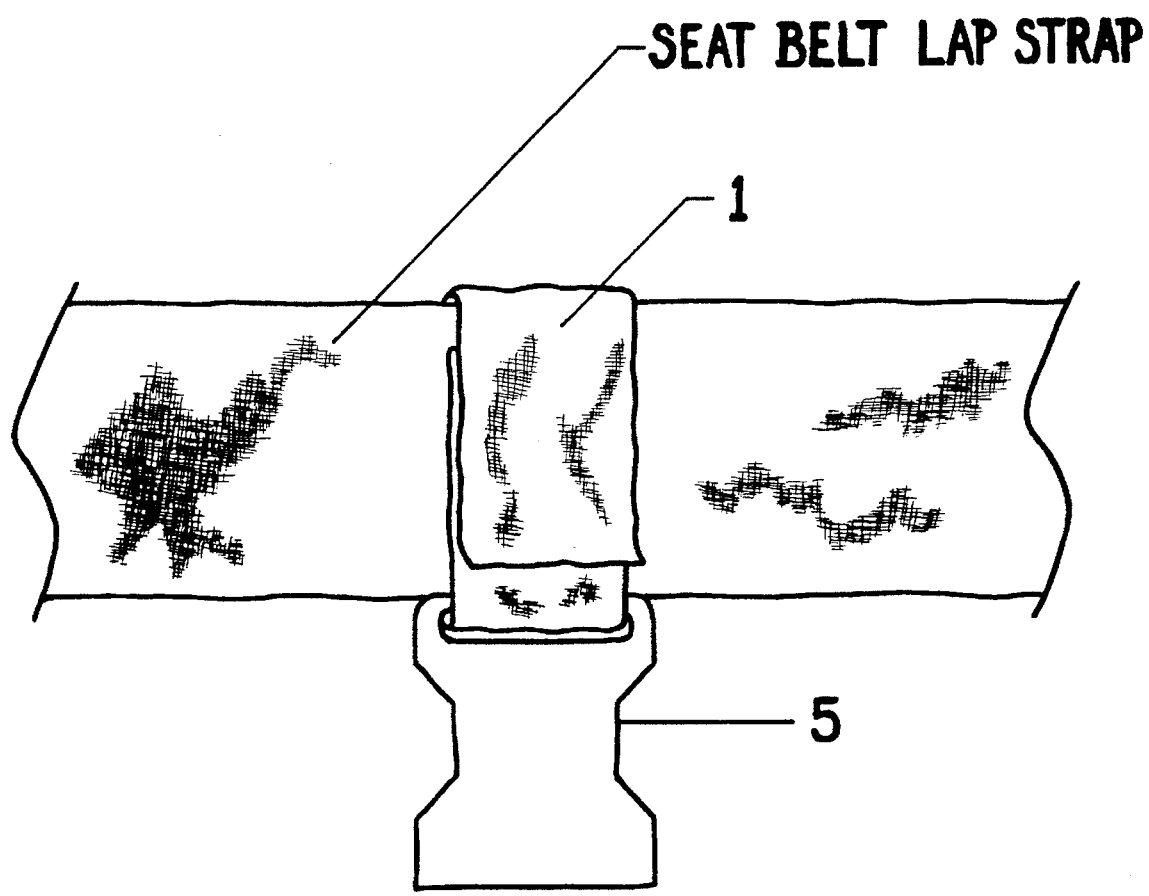

The Top Member, FIG. 1 and FIG. 2, consists of a strap (1), Velcro strips (2) and (4) which cling to each other, a stiffener material (3), and buckle (5). Top Member, FIG. 1 and FIG. 2, wraps around the lap strap of the seat belt as shown in FIG. 7. Strap (1) is held in place around the lap strap when Velcro (2) and (4) are stuck together. A snap, hook and latch assembly, button, etc. can also be substituted for Velcro (2) and (4). The stiffener material (3) can be made of plastic, teflon, cardboard or other like material and is provided to help maintain the flat shape of the seat belt as it curves over the legs and under the abdomen of the user. Buckle (5) shown in FIG. 1, FIG. 2 and FIG. 4 is half of a two piece buckle assembly. The other half of this two piece buckle assembly is shown on Bottom Member, FIG. 3, FIG. 4 and FIG. 8 as buckle (6).

Figure 3:
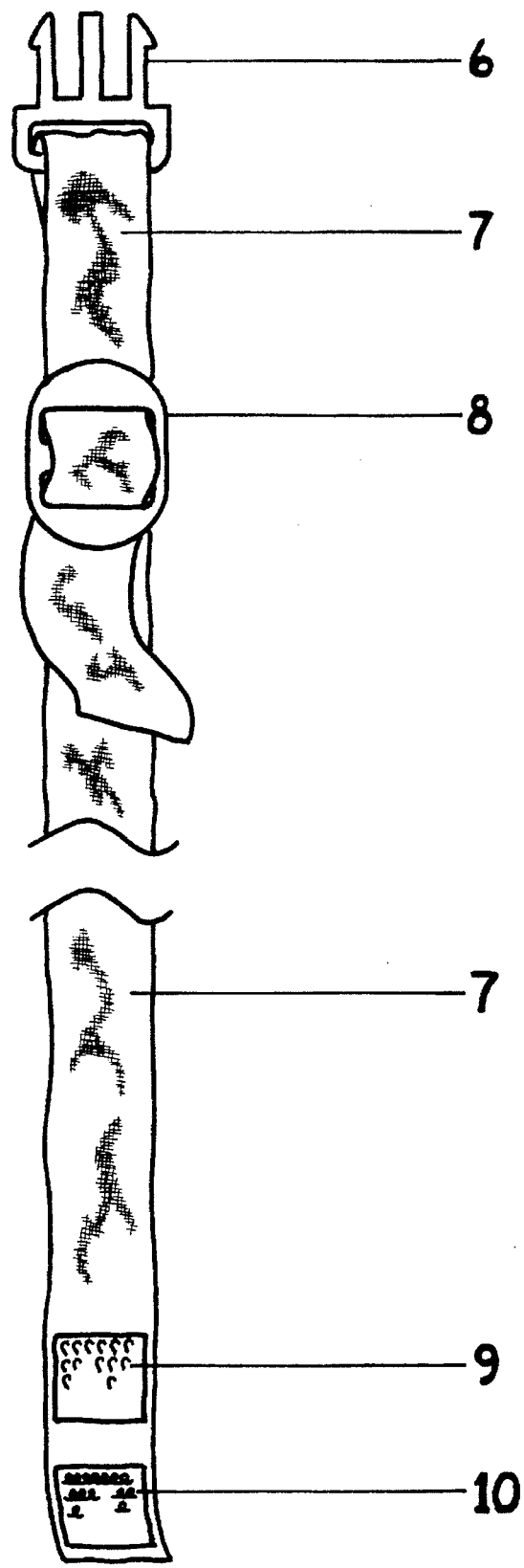
Figure 4:
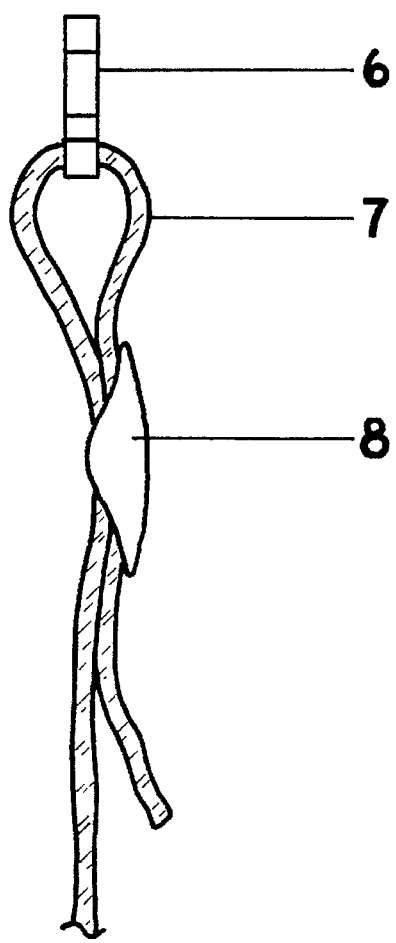
Figure 4:
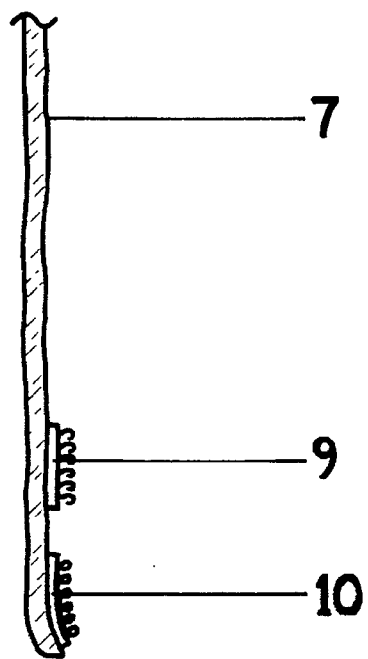
Figure 8:
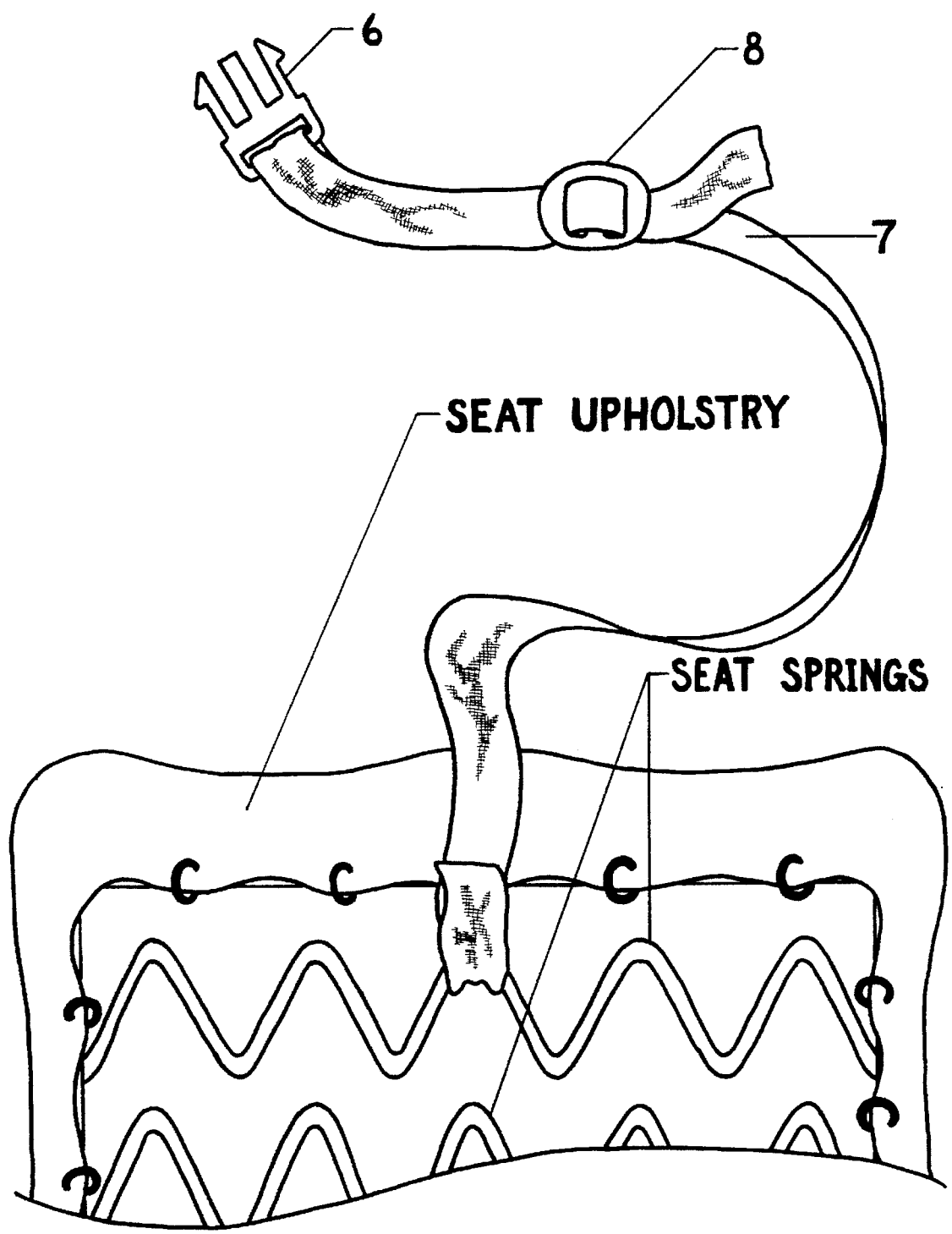

The Bottom Member, FIG. 3 and FIG. 4 consists of buckle (6), strap (7), adjusting buckle (8), and Velcro strips (9) and (10) which cling to each other. The Bottom Member, FIG. 3 and FIG. 4 is secured to the underside Of the car seat as shown in FIG. 8. Strap (7) is held in place to the underside of the car seat when Velcro (9) and (10) is wrapped around a spring or other supporting member under the car seat and is stuck together as shown in FIG. 8. The supporting member under the car seat used to secure the Bottom Member must be attached to the seat of the car and not to the floor of the car. This prevents the tightening or loosening of the present invention on the user when the user adjusts the position of the car seat The end of the Bottom Member with buckle (6) comes up from under the car seat and attaches to buckle (5), Top Member, FIG. 1, FIG. 2 and FIG. 7. The Bottom Member can be constructed of either a strapping material like the seat belt or from an elastic or rubber type material. When the Bottom Member is constructed of an elastic or rubber type material, the retracting characteristic of this type of material allows the Bottom Member to pull on the Top Member and maintain the proper tension on the lap strap of the seat belt to provide the proper fit for the user. A mechanical retracting device can also be used on the Bottom Member to maintain proper tension on the lap strap of the seat belt to provide the proper fit for the user. The Bottom Member does not hold the weight of the user in the car seat during an accident; it holds the lap strap of the seat belt in place under the users lower abdomen to help ensure that the lap strap is providing the best protection during an accident.

Figure 5:
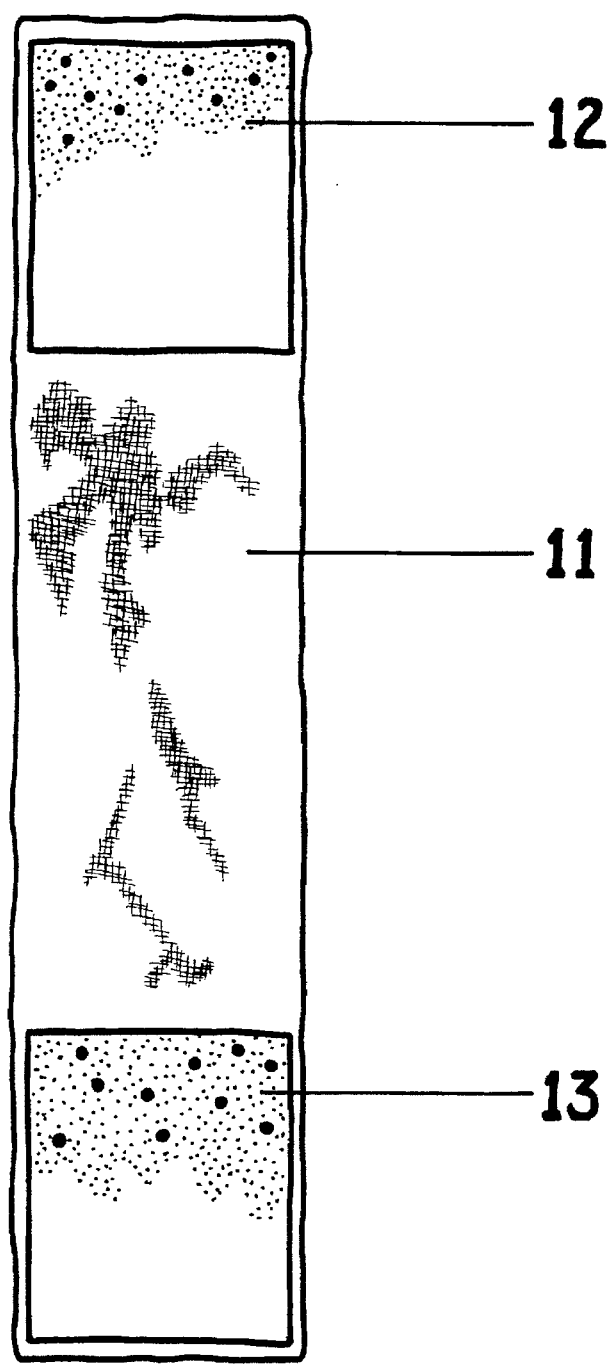
Figure 6:
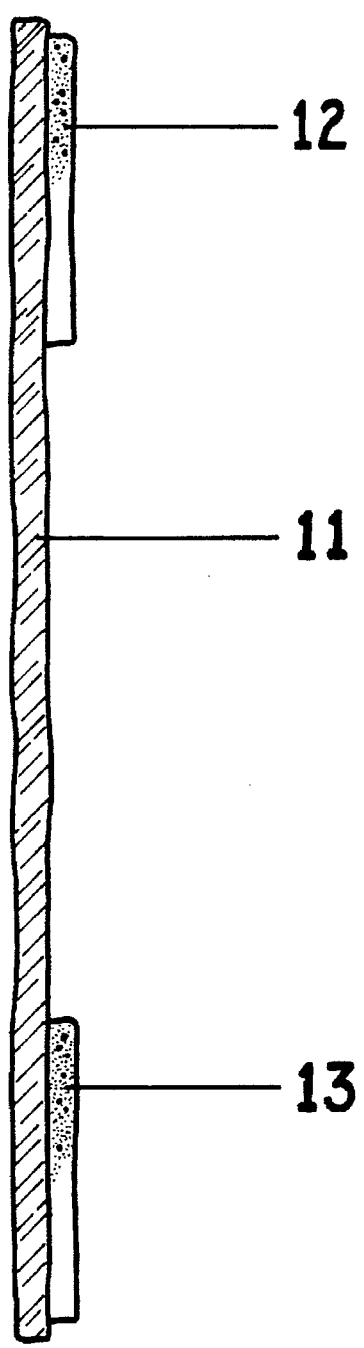
Figure 9:
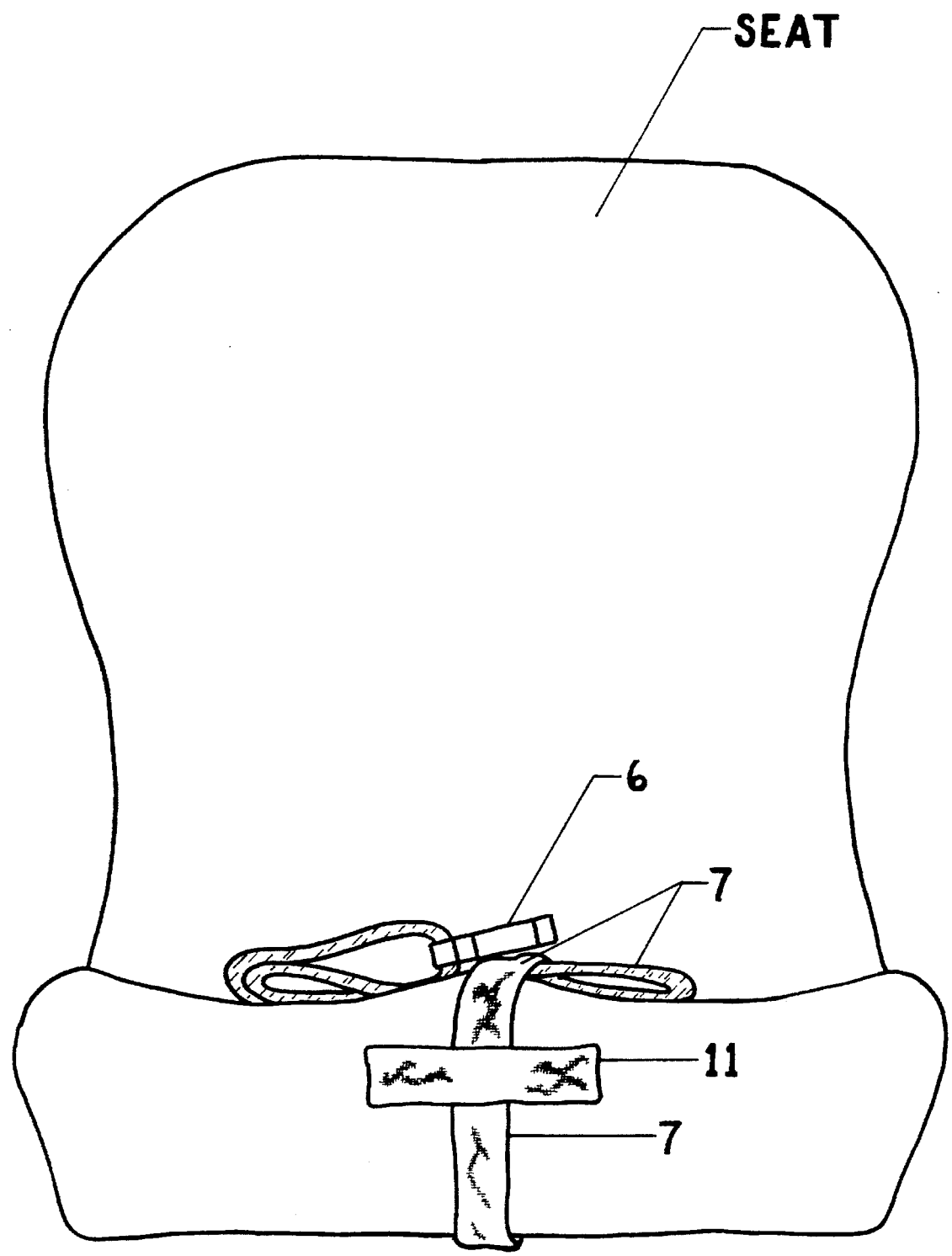

The Seat Member, FIG. 5 and FIG. 6, consists of strap (11), and Velcro or adhesive tape (12) and (13). Velcro would be used for (12) and (13) if the car seat the present invention is being used on is made of a cloth material. Adhesive tape would be used for (12) and (13) if the car seat the present invention is being used on is made of a vinyl material. The Seat Member, FIG. 5 and FIG. 6, is attached to the car seat between where the user's legs will be as shown in FIG. 9.

Figure 10:
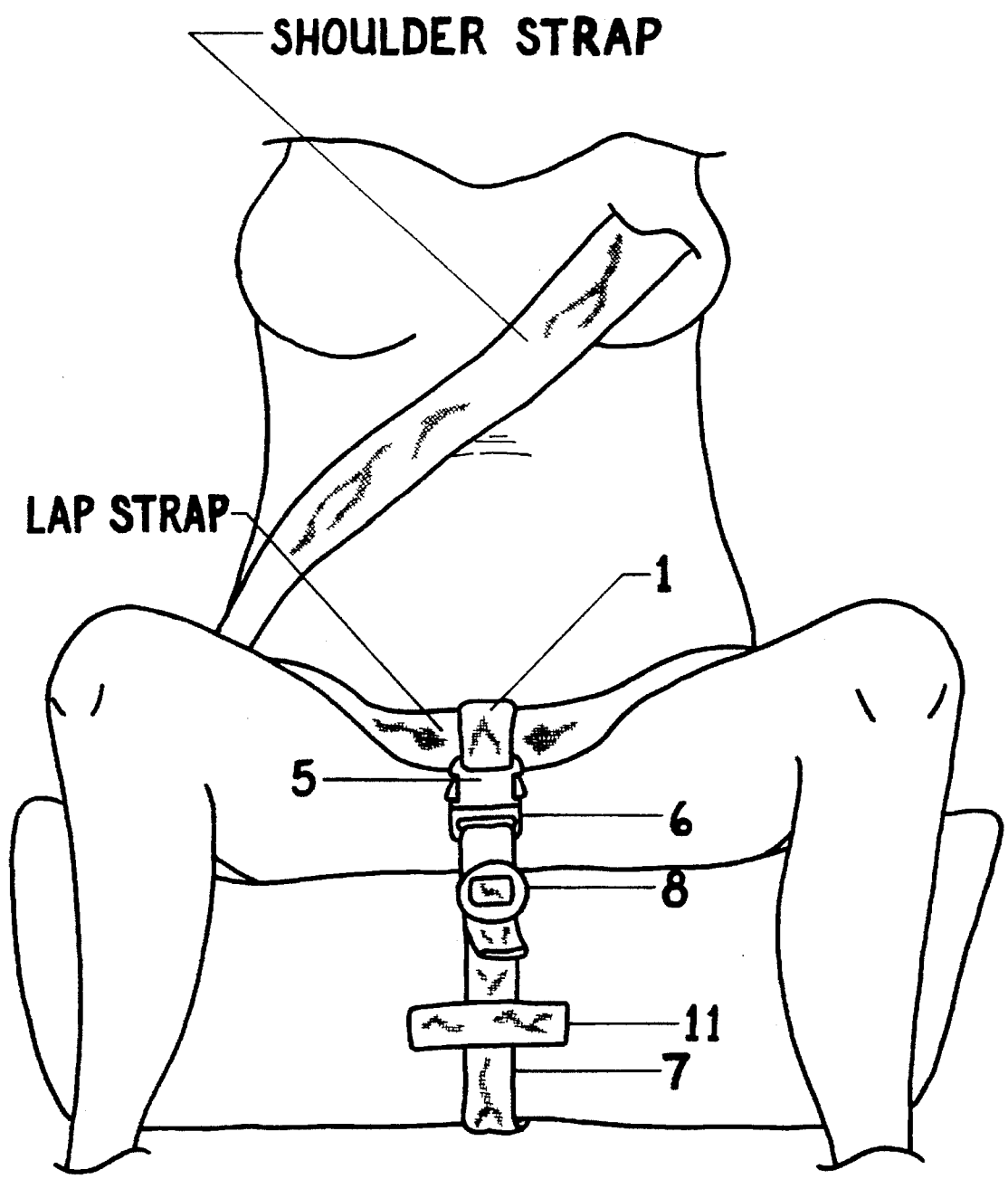

FIG. 10 shows how the Top Member, Bottom Member and Seat Member are used in conjunction with the car seat and seat belt while being worn by the user.

We claim:

1. A device for use in connection with an automobile seat and lap strap of an automobile seat belt restraint system of said automobile seat for holding said lap strap of said automobile seat belt in a downward direction on the pelvic bones of a pregnant woman or user, comprising:

(a) a two piece elongated strap made up of a top member and a bottom member adjustable in length and coupled together by a releasable fastening means to accommodate proper fit for various sizes of pregnant women or users;

(b) a means for securing one end of said two piece elongated strap to an underside framework of an automobile seat which can be pulled free of said automobile seat;

(c) a means for securing a remaining end of said two piece elongated strap to the lap strap of an automobile seat belt and being removable from said lap strap and reinforced so as to prevent said lap strap from gathering or bunching;

(d) a holder attached to an automobile seat for supporting the bottom member of said two piece elongated strap when said bottom member of said two piece elongated strap is released from the top member of said two piece elongated strap in which said bottom member is held to said automobile seat, whereby making it easier for a pregnant woman or user to retrieve said bottom member of said two piece elongated strap when seated;

(e) wherein said means for securing one end of said two piece elongated strap is made from a loop of a thin strap wrapping around an underside portion of said automobile seat framework and attaching itself with a fastening element; and (f) wherein said means for securing the remaining end of said two piece elongated strap is made from a thin strap wrapping around the lap strap of the automobile seat belt with ends of said thin strap being secured to each other with a fastening element.

2. The invention of claim 1 wherein means for reinforcing the thin strap of the top member of said two piece elongated strap is made from a stiff material being adhered to said thin strap.

3. The invention of claim 2 wherein the holder for support of the bottom member of said two piece elongated strap when said bottom member is separated from the top member of said elongated two piece strap is held to the automobile seat with an adhesive.

* * * * *